Patented June 21, 1938

2,121,724

UNITED STATES PATENT OFFICE 2,121,724

ARALKYL ETHERS OF ETHYL-PHENOL COMPOUNDS

Shailer L. Bass, Midland, Mich., and Edward M. Van Duzee, deceased, late of Midland, Mich., by Clarence H. Macomber, administrator, Midland, Mich., assignors to The Dow Chemical Company, Midland, Mich., a corporation of Michigan No Drawing. Application June 10, 1937, Serial No. 147,475

10 Claims. (Cl. 260—150)

The present invention concerns the aralkyl ethers of the ethyl-phenols and their nuclear halogenated substitution products.

These new compounds can be prepared by treating the alkali metal salt of an ethyl-phenol or a nuclear halogenated substitution product thereof with an aralkyl halide. For example, an ethyl-phenol compound is added to an alcoholic solution of metallic sodium to form the corresponding alcoholic sodium phenolate solution. An aralkyl halide is introduced slowly into this phenolate solution maintained at its reflux temperature, and the reaction mixture thereafter cooled, diluted with several volumes of water, and the ether product separated therefrom in any convenient manner, e. g. by extraction with an inorganic solvent, decantation, etc. The crude product so obtained is washed with water to remove inorganic halides therefrom and subsequently distilled or fractionally crystallized to obtain the desired ether in substantially pure form.

These new ether derivatives may also be obtained by reacting an ethyl-phenol compound with an aralkyl halide in the presence of an aqueous alcoholic solution of sodium hydroxide or other suitable alkali.

The following example is illustrative of the preparation and properties of these compounds:

78 grams (0.64 mole) of 3-ethyl-phenol was reacted with a solution of 14.7 grams (0.64 mole) of metallic sodium in 250 milliliters of alcohol to obtain an alcoholic solution of sodium 3-ethyl-phenolate. 60.9 grams (0.64 mole) of benzyl chloride was slowly added thereto over a period of 30 minutes and at the reflux temperature of the reaction mixture. Refluxing was continued for about one hour after which the reaction mixture was diluted with 3 volumes of water and extracted with benzene. The benzene extract was fractionally distilled, whereby there was obtained 94 grams (0.44 mole) of the benzyl ether of 3-ethyl-phenol as a colorless liquid boiling at 147°–150° C. at 3 millimeters pressure, and having the specific gravity 1.044 at 20°/4° C.

In a similar manner other aralkyl ethers of the ethyl-phenols were prepared of which the following are representative:

Benzyl ether of 2-ethyl-phenol, a white colorless liquid boiling at 145°–150° C. at 3 millimeters pressure, and having a specific gravity of 1.042 at 20°/4° C.

Benzyl ether of 4-ethyl-phenol, a water-white liquid boiling at 152°–155° C. at 3 millimeters pressure, and having a specific gravity of 1.029 at 20°/4° C.

Among the compounds which may be prepared by substituting other aralkyl halides for those employed in the foregoing examples are: 4-bromo-benzyl-ether of 2-ethyl-phenol; 2,4-dichloro-benzyl-ether of 3-ethyl-phenol; phenyl-ethyl-ether of 4-ethyl-phenol; phenyl-n-hexyl-ether of 2-ethyl-phenol; etc. Likewise, by substituting other ethyl-phenol compounds for those disclosed above, compounds may be prepared such as 4-iodo-benzyl ether of 2-chloro-4-ethyl-phenol, phenyl-octyl-ether of 2,4-dibromo-6-ethyl-phenol, 3-chloro-phenyl-isopropyl ether of 2-bromo-5-ethyl-phenol, etc. In place of the sodium phenolates employed in the above examples, other alcohol-soluble metallic phenolates may be employed, e. g. the potassium compounds, etc.

The compounds with which this application is particularly concerned have the following structural formula

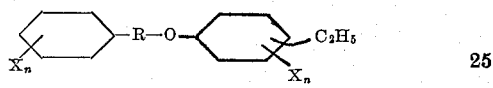

wherein each X represents a substituent selected from the group consisting of halogen and hydrogen, each $n$ is an integer not greater than 2, and R represents an alkylene radical. These compounds are useful as plasticizers for cellulose derivative compositions such as ethyl cellulose, cellulose acetate, etc.

Other modes of applying the principle of the invention may be employed instead of those explained, change being made as regards the materials employed provided the products described in the following claims be thereby obtained.

We therefore point out and distinctly claim as the invention:—

1. A compound having the formula

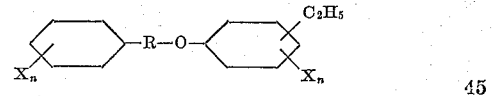

wherein each X represents a member of the group consisting of the halogens and hydrogen, each $n$ is an integer not greater than 2, and R represents an alkylene radical.

2. A compound having the formula

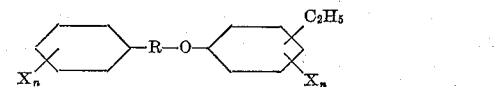

wherein each X represents a member of the group consisting of the halogens and hydrogen, each $n$ is an integer not greater than 2, and R represents an alkylene radical containing from 1 to 8 carbon atoms, inclusive.

3. A compound having the formula

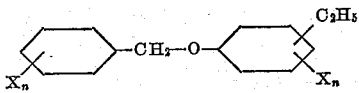

wherein each X represents a member of the group consisting of the halogens and hydrogen, and each $n$ is an integer not greater than 2.

4. A compound having the formula

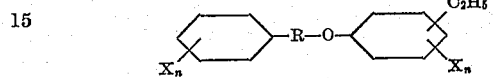

wherein each X represents halogen, each $n$ is an integer not greater than 2, and R represents an alkylene radical.

5. A compound having the formula

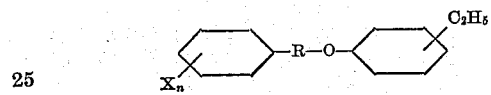

wherein X represents halogen, $n$ is an integer not greater than 2, and R represents an alkylene radical.

6. A compound having the formula

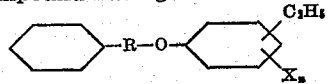

wherein X represents halogen, $n$ is an integer not greater than 2, and R represents an alkylene radical.

7. A compound having the formula

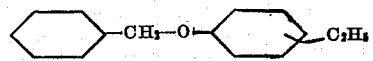

8. Benzyl ether of 2-ethyl-phenol.
9. Benzyl ether of 3-ethyl-phenol.
10. Benzyl ether of 4-ethyl-phenol.

SHAILER L. BASS.
CLARENCE H. MACOMBER,
*Administrator of the Estate of Edward M. Van Duzee, Deceased.*